US012383924B2

(12) United States Patent
Van De Hey et al.

(10) Patent No.: US 12,383,924 B2
(45) Date of Patent: Aug. 12, 2025

(54) HOTMELT APPLICATION SYSTEM AND PROCESS

(71) Applicant: C3 Corporation, Appleton, WI (US)

(72) Inventors: Joseph F. Van De Hey, Kaukauna, WI (US); Alex M. Zirbel, Kaukauna, WI (US); Alex N. Kuffel, Appleton, WI (US); Jeffery J. VanHandel, Freedom, WI (US); Grant D. Daniels, Appleton, WI (US); Scott S. Ebben, Appleton, WI (US)

(73) Assignee: C3 Corporation, Appleton, WI (US)

( * ) Notice: Subject to any disclaimer, the term of this patent is extended or adjusted under 35 U.S.C. 154(b) by 274 days.

(21) Appl. No.: 18/228,314

(22) Filed: Jul. 31, 2023

(65) Prior Publication Data

US 2023/0372962 A1 Nov. 23, 2023

Related U.S. Application Data

(60) Division of application No. 17/874,510, filed on Jul. 27, 2022, now Pat. No. 11,752,517, which is a (Continued)

(51) Int. Cl.
*B05C 5/00* (2006.01)
*B05C 5/02* (2006.01)

(52) U.S. Cl.
CPC .............. *B05C 5/027* (2013.01); *B05C 5/001* (2013.01)

(58) Field of Classification Search
CPC ....... B05B 13/0221; B05B 1/20; B05B 9/002; B05B 9/035; B05B 12/04; B05B 14/00;
(Continued)

(56) References Cited

U.S. PATENT DOCUMENTS 3,595,204 A 7/1971 McIntyre et al.
4,200,207 A 4/1980 Akers et al.
(Continued)

FOREIGN PATENT DOCUMENTS

DE 3200470 A1 8/1983
EP 0275542 A1 7/1988

OTHER PUBLICATIONS

Extended European Search Report for EP 21876271.4-1005, Sep. 24, 2024, 10 pages.
(Continued)

*Primary Examiner* — Vishal Pancholi
(74) *Attorney, Agent, or Firm* — Amundsen Davis, LLC

(57) ABSTRACT

System and process that continuously circulates hotmelt adhesive at a circulating pressure rate to apply hotmelt adhesive to a moving substrate on a substrate delivery conveyor. The system includes an adhesive delivery line connected to an elongated manifold, the manifold including: (i) a main internal fluid pathway in fluid communication with the adhesive delivery line and an adhesive return line, and (ii) an elongated heater providing a substantially constant internal temperature to the elongated manifold. An adhesive pump transporting hotmelt adhesive from the adhesive reservoir to the adhesive delivery line under pressure, the adhesive reservoir including a filter that filters hotmelt adhesive. A plurality of hotmelt spray heads in fluid communication with the main internal fluid pathway to dispense hotmelt adhesive onto the moving substrate. The adhesive return line in fluid communication with the adhesive pump and/or the adhesive reservoir to transport hotmelt adhesive from the elongated manifold.

37 Claims, 9 Drawing Sheets

Related U.S. Application Data continuation of application No. PCT/US2021/052287, filed on Sep. 28, 2021.

(60) Provisional application No. 63/180,479, filed on Apr. 27, 2021, provisional application No. 63/084,907, filed on Sep. 29, 2020.

(58) Field of Classification Search
CPC ....... B05C 5/017; B05C 5/001; B05C 5/0279; B05C 11/1039; B05C 11/1042
See application file for complete search history.

(56) References Cited

U.S. PATENT DOCUMENTS

| | | | |
|---|---|---|---|
| 4,687,137 | A | 8/1987 | Boger et al. |
| 4,770,909 | A | 9/1988 | McIntyre |
| 4,850,514 | A | 7/1989 | Scholl et al. |
| 4,919,308 | A | 4/1990 | Majkrzak |
| 4,996,091 | A | 2/1991 | McIntyre |
| 5,257,723 | A | 11/1993 | Bagung |
| 5,458,291 | A | 10/1995 | Brusko et al. |
| 5,636,790 | A | 6/1997 | Brusko et al. |
| 5,862,986 | A | 1/1999 | Bolyard et al. |
| 6,746,712 | B2 | 6/2004 | Hoffmann et al. |
| 6,752,323 | B1 | 6/2004 | Roos et al. |
| RE39,399 | E | 11/2006 | Allen |
| 7,311,941 | B2 | 12/2007 | Cesiro et al. |
| 7,527,768 | B2 | 5/2009 | Ikushima |
| 7,874,456 | B2 | 1/2011 | Bolyard, Jr. et al. |
| 8,413,848 | B2 | 4/2013 | McGuffey |
| 8,784,935 | B2 | 7/2014 | Pallante et al. |
| 8,936,178 | B2 | 1/2015 | Ganzer |
| 9,296,009 | B2 | 3/2016 | Bacco et al. |
| 9,481,007 | B2 | 11/2016 | Rzonca et al. |
| 10,046,351 | B2 | 8/2018 | Brudevold et al. |
| 10,099,243 | B2 | 10/2018 | Clark et al. |
| 10,213,806 | B2 | 2/2019 | Meyer et al. |
| 10,596,588 | B2 | 3/2020 | Clark et al. |
| 10,661,294 | B2 | 5/2020 | Brudevold et al. |
| 2004/0200858 | A1 | 10/2004 | Kappeler et al. |
| 2005/0015050 | A1 | 1/2005 | Mowery et al. |
| 2005/0242108 | A1 | 11/2005 | Harris et al. |
| 2011/0014369 | A1 | 1/2011 | McGuffey |
| 2013/0123975 | A1 | 5/2013 | Duckworth |
| 2017/0284844 | A1 | 10/2017 | Fort et al. |
| 2018/0117622 | A1 | 5/2018 | Estelle |

OTHER PUBLICATIONS

Acrolab, "Isobar® Heat Pipes ", available from the internet at https://www.acrolab.com/isobar-heat-pipes/ at least of Nov. 17, 2020, 7 pages filed herewith.

Global Systems Group, "GS-19 Hot-Melt Glue Line", available from the internet at least as of Nov. 17, 2020 at https://gsgcompanies.com/mattress-machinery/foam-based-equipment/foam-and-foam-encased-mattress-machines/gs-19-hot-melt-glue-line, 4 pages filed herewith.

Search Report & Written Opinion for PCT Patent Application No. PCT/US2021/052287 "Hotmelt Application System and Process" dated Jun. 2, 2022, 9 pages filed herewith.

Global Systems Group, "GS-19 Hot-Melt Glue Line", available from the internet at least as of Dec. 2020 at https://gsgcompanies.com/document/load/gsg-gs-19-27185-ca.pdf, 2 pages filed herewith.

Global Systems Group, "GS-19 Hot-Melt Glue Line" YouTube video, available from the internet at https://www.youtube.com/watch?v=mW_GbKLPek0 at least as of Feb. 21, 2019, 73 pages filed herewith.

Adhesive Melter Micron Piston Series Instructions Manual, Edition Jan. 2020, Focke Meler Gluing Solutions, publication date Dec. 29, 2020, (https://web.archive.org/web/20201229192341/https:/www.meler.eu/docs/Manual . . . Fusores . . . Micron . . . Piston . . . ENG.pdf), 100 pages filed herewith.

D'Amore, Elizabeth Lee, Third Party Submission Under 37 CFR 1.290, filed May 12, 2023 in parent U.S. Appl. No. 17/874,510, 3 pages filed herewith.

D'Amore, Elizabeth Lee, Third Party Submission, Claim Chart of Independent Claim 38, filed May 12, 2023 in parent U.S. Appl. No. 17/874,510, 24 pages filed herewith.

D'Amore, Elizabeth Lee, Third Party Submission, Claim Chart of Independent Claim 61, filed May 12, 2023 in parent U.S. Appl. No. 17/874,510, 26 pages filed herewith.

D'Amore, Elizabeth Lee, Third Party Submission, Claim Chart of Independent Claim 63, filed May 12, 2023 in parent U.S. Appl. No. 17/874,510, 24 pages filed herewith.

D'Amore, Elizabeth Lee, Third Party Submission, Claim Chart of Independent Claim 65, filed May 12, 2023 in parent U.S. Appl. No. 17/874,510, 24 pages filed herewith.

HOTMELT APPLICATION SYSTEM AND PROCESS

CROSS-REFERENCE TO RELATED APPLICATION

This application is a divisional of U.S. Non-Provisional application Ser. No. 17/874,510, filed on Jul. 27, 2022 and titled: HOTMELT APPLICATION SYSTEM AND PROCESS, which is a continuation of PCT Application No. PCT/US21/52287, filed on Sep. 28, 2021 and titled HOTMELT APPLICATION SYSTEM AND PROCESS, which claims the benefit of: (i) U.S. Provisional Application No. 63/084,907, filed Sep. 29, 2020 and titled: HOTMELT SPRAY APPLICATION FOR INLINE HIGH SPEED SYSTEM and (ii) U.S. Provisional Application No. 63/180,479, filed Apr. 27, 2021 and titled: HOTMELT APPLICATION SYSTEM AND PROCESS.

TECHNICAL FIELD

This invention generally relates to hotmelt adhesive heating and dispensing equipment, and more particularly to systems and processes for heating, circulating and dispensing hotmelt adhesive onto a moving substrate.

BACKGROUND

Hotmelt adhesive systems have many applications in manufacturing and packaging. For example, thermoplastic hotmelt adhesive materials are used for carton sealing, case sealing, tray forming, pallet stabilization, nonwoven applications including diaper manufacturing, and other applications. Typically, hotmelt adhesive materials are contained in or provided from an adhesive supply, such as a tank or reservoir of an adhesive melter. The hotmelt adhesive material is melted, heated, and pumped to a dispenser, such as a dispensing nozzle or other applicator which applies the hotmelt adhesive material to a carton, case, mattress components or other objects or substrates to be bonded together. For the adhesive supply, different types of reservoirs have been developed. Manifolds are used to direct liquid hotmelt adhesive into plural flow streams for output through hoses to dispensers or spray heads. Heaters are typically thermally connected to several components of a hotmelt adhesive system, including the adhesive supply (such as a tank or reservoir), manifold, hoses, and/or dispensers. The heaters try to maintain the hotmelt adhesive material at proper adhesive temperature and related viscosity.

In addition, different types of pumps have been used in hotmelt adhesive systems. Piston pumps, for example, use a piston to move a hydraulic plunger, which drives liquid hotmelt adhesive material through the hotmelt adhesive system. Gear pumps employ counter-rotating gears to create positive displacement for more precise metering of liquid hotmelt adhesive. Pumps move the liquid hotmelt adhesive through the hotmelt adhesive system, including through the hoses and to the dispensers for application to an object or substrate. Also, filters are employed in existing application systems to help remove contaminates from the hotmelt adhesive. Such filters are located, for example, at various points after the pump to help filter contaminates before hotmelt adhesive gets to the dispensers or spray heads after leaving the pump.

Critical to these systems is providing a constant, desired temperature to keep the liquified hotmelt adhesive in the right temperature range throughout the system, and not too hot or it will burn nor too cold or it will not have the right viscosity and flow as desired. Additionally, maintaining the right pressure is also important to get the desired rate of hotmelt adhesive dispensing at the right time. And, keeping contaminates, including burnt hotmelt adhesive, out of the circulating hotmelt adhesive is also important to a properly functioning application system. However, often these requirements compete with each other and even move each other in opposite directions. Thus, there is a need to address one or more of the deficiencies in the art to better aid in achieving more desirable requirements and avoiding negative ones, for operating a hotmelt application system that is more consistent and reliable for applying hotmelt adhesive to a substrate.

SUMMARY

To address one or more deficiencies in the art and/or better achieve the desirable requirements for hotmelt system application, including preferably delivering a high volume of hotmelt adhesive quickly and cleanly over a variety of delivery parameters, there is provided a system that continuously circulates hotmelt adhesive at a circulating pressure rate before, during and after applying hotmelt adhesive to a moving substrate on a substrate delivery conveyor. The system includes an adhesive delivery line connected to a first end of an elongated manifold and an adhesive return line connected to an opposite end of the elongated manifold. The elongated manifold includes a main internal fluid pathway in fluid communication with the adhesive delivery line and the adhesive return line to transport the hotmelt adhesive from the first end to the opposite end. The elongated manifold also includes an elongated heater in thermal communication with the main internal fluid pathway and providing a substantially constant internal temperature to the elongated manifold when the hotmelt adhesive is transported from the first end of the elongated manifold to the opposite end of the elongated manifold. The system further includes an adhesive pump in fluid communication with both the adhesive delivery line and an adhesive reservoir. The adhesive pump is transporting the hotmelt adhesive from the adhesive reservoir to the adhesive delivery line under pressure. The adhesive reservoir is including a filter that filters the hotmelt adhesive before the hotmelt adhesive enters the adhesive pump. A plurality of hotmelt spray heads are connected with the elongated manifold and in fluid communication with the main internal fluid pathway to receive the hotmelt adhesive and dispense the hotmelt adhesive onto the moving substrate. The adhesive return line is in fluid communication with at least one of the adhesive pump and the adhesive reservoir to transport hotmelt adhesive that has circulated through the elongated manifold.

Also described herein are aspects concerning a process, which preferably delivers hotmelt adhesive without directly controlling the pressure in the system and/or without directly metering the amount of hotmelt adhesive dispensed from the system, apply hotmelt adhesive to a moving substrate. The process includes heating hotmelt adhesive in an adhesive reservoir. The process also includes using an elongated manifold connected between an adhesive delivery line and an adhesive return line, the elongated manifold having a main internal fluid pathway in fluid communication with the adhesive delivery line and the adhesive return line to transport hotmelt adhesive though the elongate manifold. Another step is heating the elongated manifold to a substantially constant internal temperature when the hotmelt adhesive is transported through the elongated manifold. And, a step of flowing the hotmelt adhesive from the adhesive reservoir to the adhesive pump. The process also includes filtering the hotmelt adhesive in the adhesive reservoir before the hotmelt adhesive enters an adhesive pump. Another step is pumping hotmelt adhesive at a circulating pressure rate to the adhesive delivery line and thereby to the main internal fluid pathway. And, a step of spraying hotmelt adhesive through a plurality of hotmelt spray heads, the spray heads connected to the elongated manifold and in fluid communication with the main internal fluid pathway to receive the hotmelt adhesive. Further, there is moving the substrate past the spray heads at an application speed to apply hotmelt adhesive to the moving substrate at an application rate. There is also continuously circulating hotmelt adhesive at the circulating pressure rate through the elongated manifold before, during and after spraying hotmelt adhesive on the substrate. And, another step is returning hotmelt adhesive to at least one of the adhesive pump and the adhesive reservoir.

Other aspects of the disclosure are directed to configurations and features for the hotmelt adhesive lines, filtering, heating of the system, and spray heads.

BRIEF DESCRIPTION OF THE DRAWINGS

The invention may be more completely understood in consideration of the following detailed description of various embodiments of the invention in connection with the accompanying drawings, in which.

Figure 1:
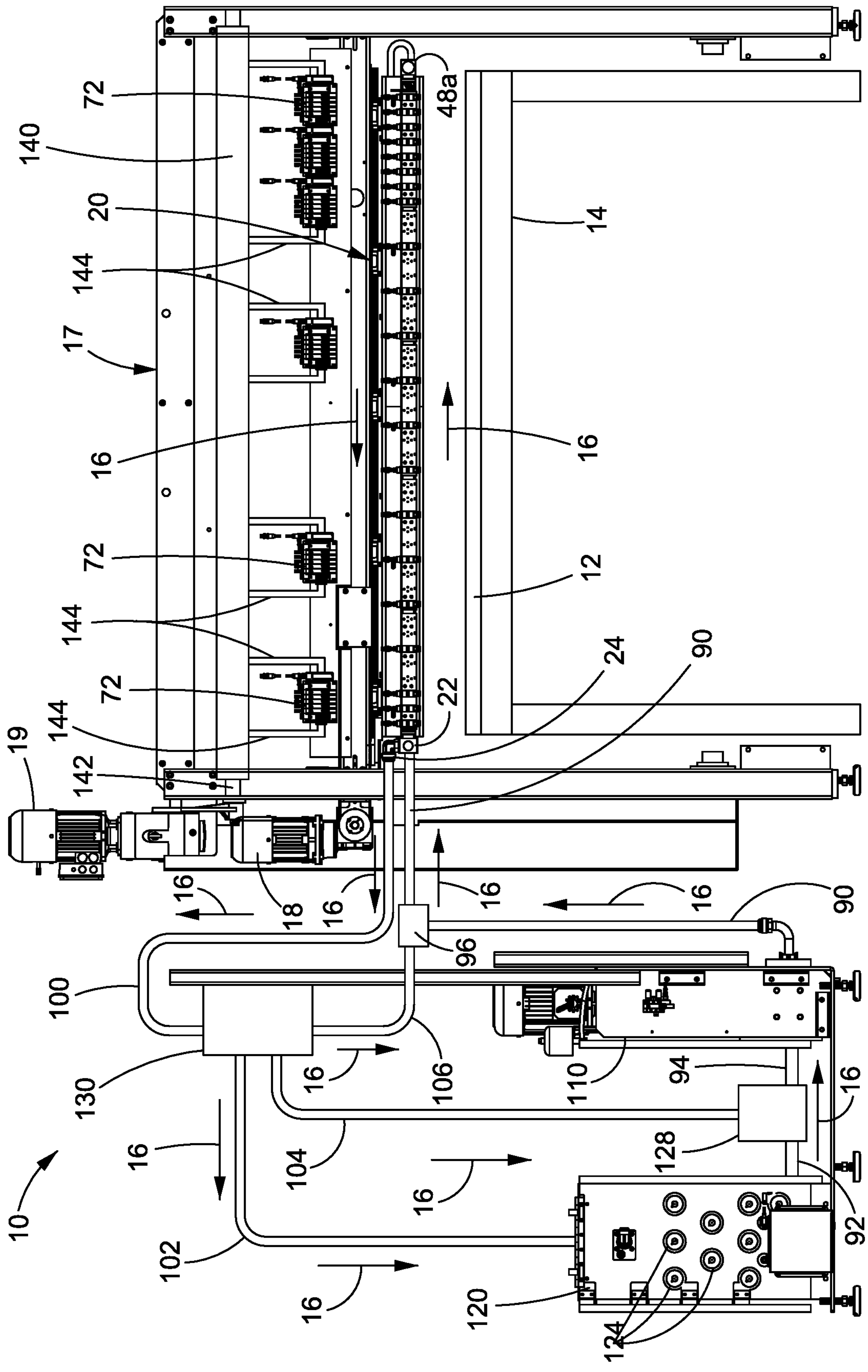
FIG. 1 is a front view of a system that continuously circulates hotmelt adhesive at a circulating pressure rate before, during and after applying hotmelt adhesive to a moving substrate on a substrate delivery conveyor.

The drawings show some but not all embodiments. The elements depicted in the drawings are illustrative and not necessarily to scale, and the same (or similar) reference numbers denote the same (or similar) features throughout the drawings, though all the same (or similar) features are not always separately numbered to help avoid over numbering and obscuring what the drawings are disclosing.

DETAILED DESCRIPTION

In accordance with the practice of the innovative system and related process here, as seen in the Figures for example FIG. 1, system 10 continuously circulates hotmelt adhesive at a circulating pressure rate before, during and after applying hotmelt adhesive to a moving substrate 12 on a substrate delivery conveyor 14. Substrate 12 moves through the system orthogonally into the page depicting FIG. 1. That is, the substrate would move into the face of the drawing page to pass under the spray heads of system 10 depicted there. System 10 is considered to continuously circulate hotmelt before, during and after applying hotmelt adhesive as long as it does so for some overlapping period of time for each of the times it does so before, during and after applying hotmelt adhesive. That is, continuously does not require hotmelt to circulate forever before, during and after applying hotmelt adhesive when the system 10 is operating but only for some overlapping period of time for each of before, during and after applying hotmelt adhesive to the substrate 12. Preferably, continuously circulate hotmelt before, during and after applying hotmelt adhesive occurs, in order of increasing preference, at least 25% of the time, at least 50% of the time, at least 75% of the time, at least 90% of the time, or essentially all of the time, system 10 is operating, in order to take better advantage of the capabilities of system 10 as taught herein. Further in this regard, with such continuous circulation, then how much hotmelt adhesive is applied to the moving substrate is preferably controlled by the substrate delivery conveyor 14. That is, in this way the substrate delivery conveyor moves the substrate past the spray heads at an application speed to apply hotmelt adhesive to the moving substrate at an application rate (described further herein) while the system continuously circulates hotmelt adhesive before, during and after applying hotmelt adhesive to the moving substrate 12. The application speed can be as desired by the system user based on the teaching herein and what one of ordinary skill in the art knows for a desired amount of hotmelt adhesive depending on the use being made of the moving substrate, for example, a foam mattress, bedding materials, or other hotmelt adhesive bonded materials.

Figure 8:
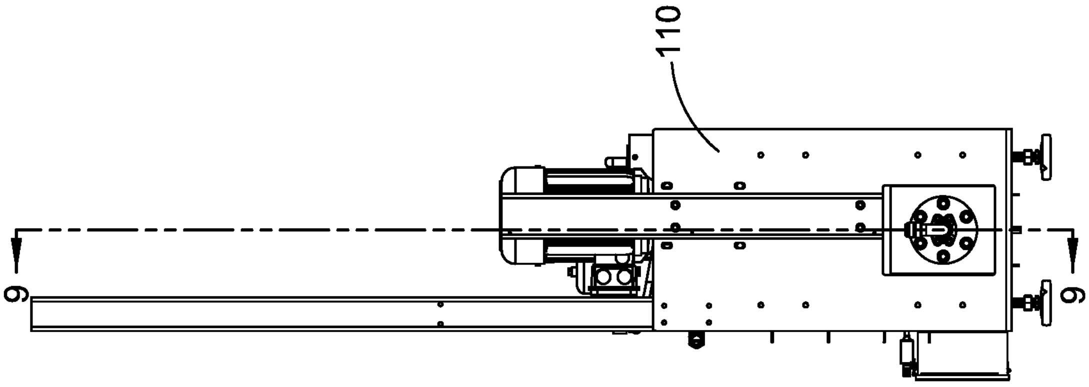
FIG. 8 is a side view of the adhesive pump and adhesive reservoir product for the system seen in FIG. 1.
Figure 9:
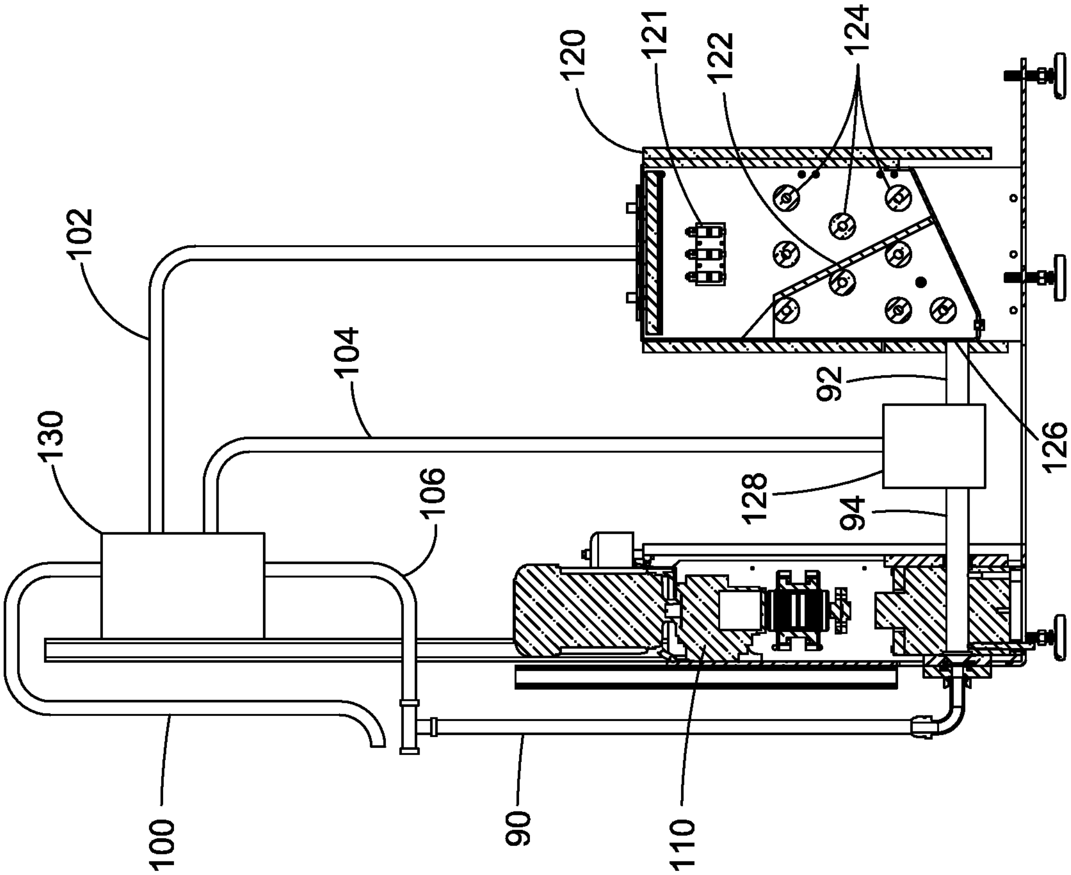
FIG. 9 is a cross-sectional view of that in FIG. 8, taken along the line 9-9.

Also referring to FIGS. 2-7, for example, system 10 includes an adhesive delivery line (including hotmelt hose 90) connected to a first end 22 of an elongated manifold 20 and an adhesive return line (including hotmelt hose 100) connected to an opposite end 24 of the elongated manifold 20. The delivery and return lines can be any tubing or hose or similar functioning structure made of conventional materials suitable to transport hotmelt adhesive as contemplated herein. The elongated manifold 20 includes a main internal fluid pathway 26 in fluid communication with the adhesive delivery line and the adhesive return line to transport the hotmelt adhesive from the first end 22 to the opposite end 24. The elongated manifold 20 also includes an elongated heater 50 in thermal communication with the main internal fluid pathway 26 and providing a substantially constant internal temperature to the elongated manifold when the hotmelt adhesive is transported from the first end of the elongated manifold to the opposite end of the elongated manifold. Referring to FIGS. 1, 8 and 9 also, system 10 further includes an adhesive pump 110 in fluid communication with both the adhesive delivery line (including hotmelt hose 90) and an adhesive reservoir 120. The adhesive pump 110 transports the hotmelt adhesive from the adhesive reservoir 120 to the adhesive delivery line (including hotmelt hose 90) under pressure. The adhesive reservoir includes a filter 122 (FIG. 9) that filters the hotmelt adhesive before the hotmelt adhesive enters the adhesive pump. A plurality of hotmelt spray heads 70 are connected with the elongated manifold 20 and in fluid communication with the main internal fluid pathway 26 to receive the hotmelt adhesive and dispense the hotmelt adhesive onto the moving substrate 12. The adhesive return line (including hotmelt hose 100) is in fluid communication with at least one of the adhesive pump 110 and the adhesive reservoir 120 to transport hotmelt adhesive that has circulated through the elongated manifold 20. Various types of pumps can be used in system 10, including adhesive pump 110 as a gear type hotmelt adhesive pump. Any such pump, preferably, includes capability to enable at least the circulating pressure rate and/or the application rate described herein and the advantage(s) those features can bring to system 20.

Surprisingly, it has been found that particular features of the elongated manifold enable system 20 for applying hotmelt adhesive better than, and unlike, ever before, including the volume of hotmelt adhesive that can be delivered to the moving substrate and/or the quality of the hotmelt adhesive that can be delivered to the moving substrate. For example, the main internal fluid pathway can have a length 28 of at least one meter and a cross-sectional diameter 30 of about 1 centimeter to about 5 centimeters. And, more preferably, in order of increasing preference, the cross-sectional diameter is about 1.5 centimeters to about 4 centimeters, is about 2 centimeters to about 3 centimeters, or is about 2.5 centimeters. Further in this regard, still more preferably, the main internal fluid pathway has a substantially same cross-sectional diameter along its length. For example, in this way, the fluid flow rate, pressure and/or temperature of the hotmelt adhesive can be more consistent as the flow path is generally the same from the first end 22 to the opposite end 24.

Figure 6:
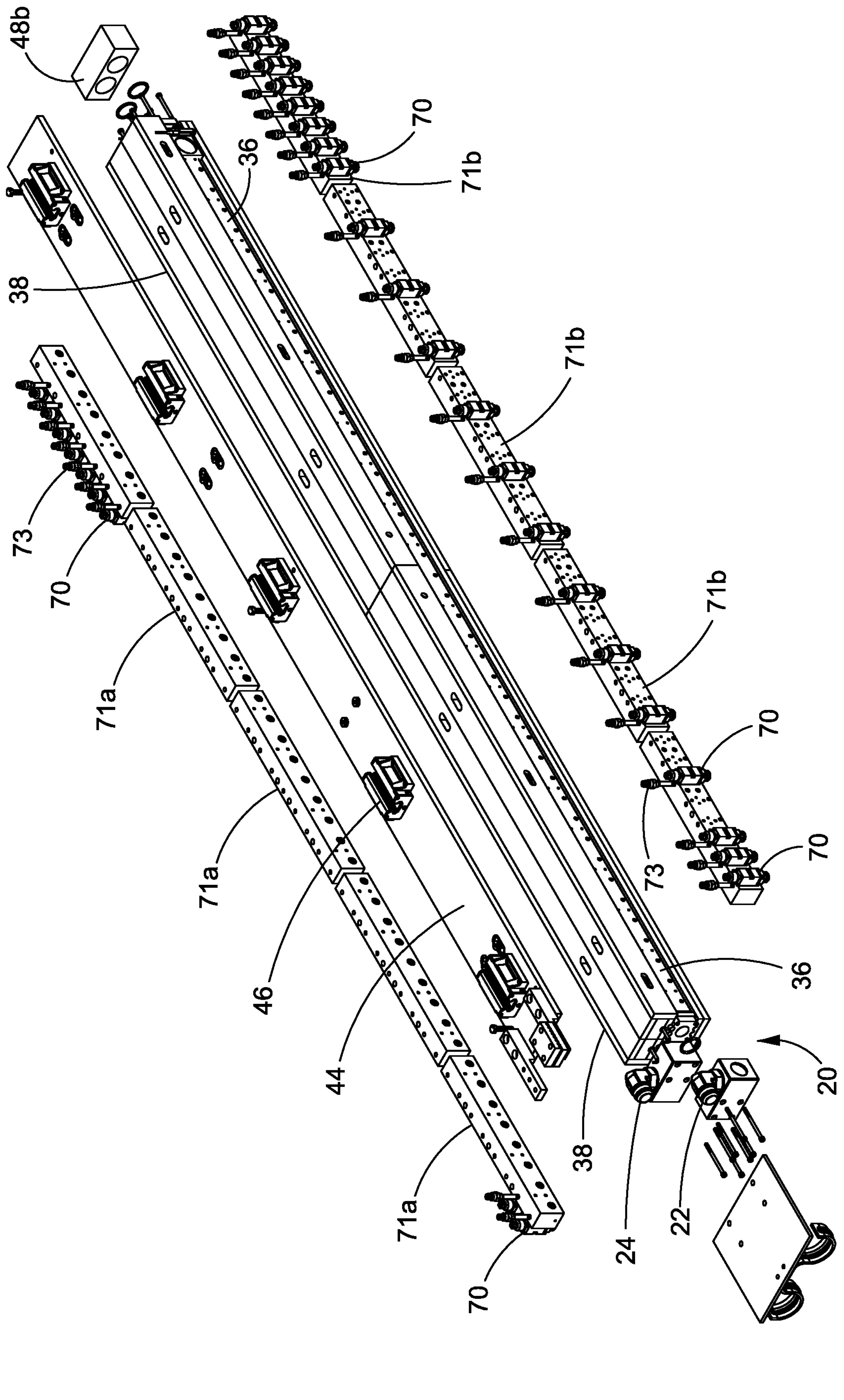
FIG. 6 is a perspective view of a portion of the system seen in FIG. 1, depicting a partial assembly of first and second elongated manifold portions with a securing plate with carrier brackets overhead and spray head manifolds with a plurality of spray heads on either side of the manifold portions and delivery and return line connectors partially assembled as well.
Figure 7:
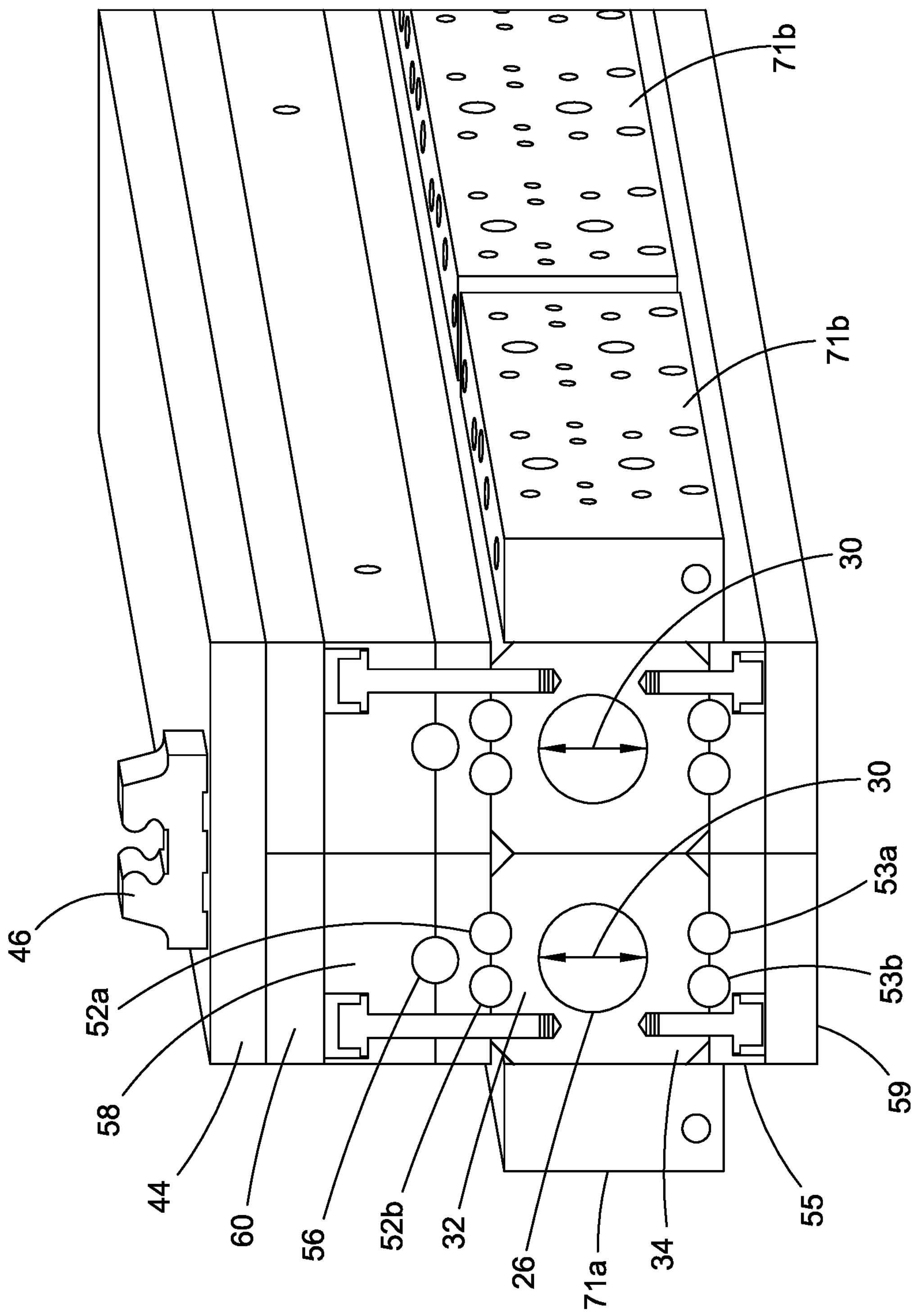
FIG. 7 is a perspective cross-sectional view of a portion of that seen in FIG. 6, with portions assembled together and other portions not assembled yet.

Referring to FIGS. 6 and 7, other aspects of the elongated manifold are disclosed. For example, elongated manifold 20 can be a first elongated manifold portion 36 and a second elongated manifold portion 38. These can be essentially identical to each other, and only one manifold portion is required for the elongated manifold 20 of system 10. When two portions 36, 38 are used, preferably each elongated manifold portion 36, 38 is arranged parallel to each other elongated manifold portion 38, 36 in a u-shaped relationship and fixed together relative to each other. More preferably, the u-shaped relationship can be a side by side arrangement, as depicted in FIGS. 6 and 7. Portions 36, 38 can be fixed together by any conventional materials like screws, bolts, welding, or otherwise affixing them together. For example, a securing plate 44 can be screwed into a portion of each portion 36, 38. Plate 44 can include a carrier bracket 46 for movably mounting system 10 to a frame 17. Motor 18 can be linked to and operate system 10 by the carrier brackets for horizontal movement of system 10. Motor 19 can be linked to and operate system 10 by the carrier brackets for vertical movement of system 10.

Without being limited to a theory of understanding, delivering a large volume of hotmelt adhesive, and doing so with a consistent temperature, pressure and/or viscosity, has proven particularly challenging for hotmelt delivery systems. Accordingly, and referring to FIG. 1, the inventors have discovered new and different configurations for flow paths 16, and control of the same, that can be employed unlike before. For example, the flow path for the adhesive delivery line can include hotmelt hose 92 connected to the adhesive reservoir 120 and going to adhesive reservoir delivery/receiving junction mechanism 128 with valves (not shown) that can be opened and closed to achieve the desired flow path(s). From mechanism 128 the delivery line can go to adhesive pump 110 via hotmelt hose 94. From the adhesive pump, the delivery line can go to the elongated manifold first end 22 via hotmelt hose 90. The adhesive return line can include hotmelt hose 100 connected to the elongated manifold opposite end 24 at one end and going to adhesive return line junction mechanism 130 with valves (not shown) that can be opened and closed to achieve the desired flow path(s) leaving the elongated manifold 20. After mechanism 130, one flow path 16 can go back to the adhesive reservoir via hotmelt hose 102. Alternatively, or additionally, another flow path after mechanism 130 can go to mechanism 128 between the adhesive reservoir and the adhesive pump, via hotmelt hose 104. Yet alternatively, or additionally, a third flow path can go to hotmelt hose 90 between the adhesive pump and the first end 22 of the elongated manifold, via hotmelt hose 106. At hose junction 96, it can include a valve mechanism like 128 and 130 (valve not shown). These valves and their controls can be any conventional parts and related controls known to one of ordinary skill in the art to achieved the desired functions in combination with the teachings herein. To be clear, while the parts and controls may be conventional, their uses and combined configurations are not conventional, and are new and different as taught herein.

Accordingly, employing the various flow paths possible, for example, the adhesive return line can be in fluid communication with both of the adhesive pump 110 (via 100, 130, 104, 128 and 94) and the adhesive reservoir 120 (via 100, 130, 102, 120, 92, 128 and 94) to transport hotmelt adhesive that has circulated through the elongated manifold, and this can occur mutually exclusively or simultaneously on these paths, as desired. As another example, the adhesive pump can be in fluid communication with the adhesive return line to receive hotmelt adhesive that has circulated through the elongated manifold (via 100, 130, 104, 128, 94 and 110, or via 100, 130, 102, 120, 92, 128, 94 and 110) and return hotmelt adhesive to the adhesive delivery line (via 90, 96 and 90). Alternatively, for example, the adhesive pump can be in fluid communication with the adhesive return line to receive hotmelt adhesive that has circulated through the elongated manifold and return hotmelt adhesive to the adhesive delivery line without passing through the adhesive reservoir (via 100, 130, 104, 128, 94, 110 90, 96 and 90, or via 100, 130, 106, 96 and 90). Yet alternatively, the hotmelt adhesive from the adhesive delivery line can bypass the adhesive pump and only enter the adhesive reservoir and from there pass through filter 122 (FIG. 9) in the reservoir and travel back to the adhesive pump (via 100, 130, 102, 120, 92, 128, 94 and 110) and from there back into manifold 20 via 90, 96 and 90.

Other aspects of system 10 concern filtering the hotmelt adhesive, and also, not filtering the hotmelt adhesive, relative to portions of the system. That is, the inventors have discovered new ways to filter and deal with the traditional problem of impurities in melted hotmelt adhesive that circulates through system 10, including burnt hotmelt itself (especially when the system is not dispensing hotmelt adhesive), while also not negatively impacting the hotmelt adhesive flow rate and/or not dispensing of hotmelt adhesive out of the hotmelt spray heads. That is, before system 10, one of skill in the art had to choose between quality filtering of hotmelt adhesive to remove impurities that can clog the manifold and/or spray heads, and operating a hotmelt application system at sufficient pressure and/or volume to deliver a desired amount of hotmelt adhesive to the moving substrate. Now, with system 10, the user can, preferably, have one or more of these features without compromise to the other feature(s). For example, preferably the adhesive reservoir is in fluid communication with the adhesive return line to receive hotmelt adhesive that has circulated through the elongated manifold and the hotmelt adhesive then passes though the filter before returning to the adhesive delivery line. Additionally, or alternatively, more preferably the hotmelt adhesive passes though the filter at a filter pressure rate, and the filter pressure rate is less than the circulating pressure rate of the hotmelt adhesive transported through the elongated manifold. Still more preferably, and in increasing degrees of preference, the filter pressure rate is no more than about 5%, no more than about 4%, no more than about 3%, no more than about 2% or no more than about 1%, of the circulating pressure rate. For example, if the circulating pressure rate is between 150 pounds per square inch ("psi") and 1000 psi, which is a traditional circulating pressure rate for hotmelt adhesive application systems, then the preferred filter pressure rate of system 10 is no more than 7.5 psi to 50 psi for 5% of the circulating pressure range, and no more than 1.5 psi to 10 psi for 1% of the circulating pressure range. Still additionally, or alternatively, more preferably the hotmelt adhesive transported through the system is essentially unfiltered after the hotmelt adhesive leaves the adhesive reservoir and not filtered again unless the hotmelt adhesive returns to the adhesive reservoir. In this way, and as discussed further below, filter plugging is better eliminated or managed because the only filter in the system is in the adhesive reservoir.

Referring to FIGS. 1, 8 and 9, other aspects of the adhesive pump and adhesive reservoir are disclosed and now further discussed. Filter 122 preferably sits inside the hotmelt reservoir 120 in proximity to heating elements that help liquefy the hotmelt adhesive as adhesive enters the reservoir and deposits into the pool of melted hotmelt adhesive. Hotmelt adhesive gets to reservoir 120 via hotmelt hose 102 (as discussed previously) and/or via a separate hotmelt hose (not shown) supplied by a hotmelt adhesive melting pot (not shown) upstream of reservoir 120 that receives solid hotmelt adhesive which is subsequently melted in the melting pot and turned into hot, flowable liquid hotmelt adhesive for use in system 10. Hotmelt adhesive in reservoir 120 flows through the filter 122, preferably through essentially only the force of gravity acting on the hotmelt adhesive but also by some of the draw down action that also impacts the pool of hotmelt adhesive being transported from reservoir 120 to and through pump 110. When coming from hose 102, hotmelt adhesive enters reservoir 120 through adhesive entry valves (each of the three valves shown can be selectively and individually, opened and closed as desired to operate with the overall system 10), and hotmelt adhesive then goes down onto and in between heating elements 124 that help maintain the desired hotmelt adhesive temperature inside the reservoir and thus for the hotmelt adhesive in the reservoir. Heating elements 124 extend into the through the reservoir from one side of the container to the other and heating preferably occurs, primarily, inside the container space, as opposed to along the walls of the container. Additionally, or alternatively, heating elements 124 can be independently controlled to provide more variable and controllable temperature in reservoir 120, as desired by the user. From there, the hotmelt adhesive passes over and around heaters 124 and goes through filter 122 as it progresses toward and into delivery port 126. Port 126 is connected to hotmelt hose 92 where hotmelt has its earliest entry into the adhesive delivery line and eventual flow path to the elongated manifold. The filter 122 preferably has a filtering screen or slots with hole size slightly less than the smallest spray head orifice that will dispense hotmelt adhesive onto the moving substrate, to avoid any contaminates entering the system that could plug up the spray heads. Additionally, preferably the filtering screen or slots will have a hole size small enough to filter desired adhesive contaminates even if such contaminates would not otherwise negatively impact the system during operation. Filter 122 is preferably formed into a sheet-like structure positioned within the reservoir to filter hotmelt adhesive before it passes through delivery port 126 and doing so at a sufficient quantity and at a desired flow rate to be able to consistently filter the adhesive without overflowing the reservoir. Additionally, preferably, the filter can be positioned at an angle so it is not exactly horizontal nor exactly vertical, but some angle in between these, and more preferably, in order of increasing preference, between about 70 degrees and about 20 degrees off of vertical, between about 60 degrees and about 30 degrees off of vertical, or between about 50 degrees and about 40 degrees off of vertical. As needed, the filter can be easily removed and replaced with a clean filter, all while the system is operating because the filter pressure rate is, preferably, so much less than the operating pressure rate in the filter area of the reservoir.

Figure 5:
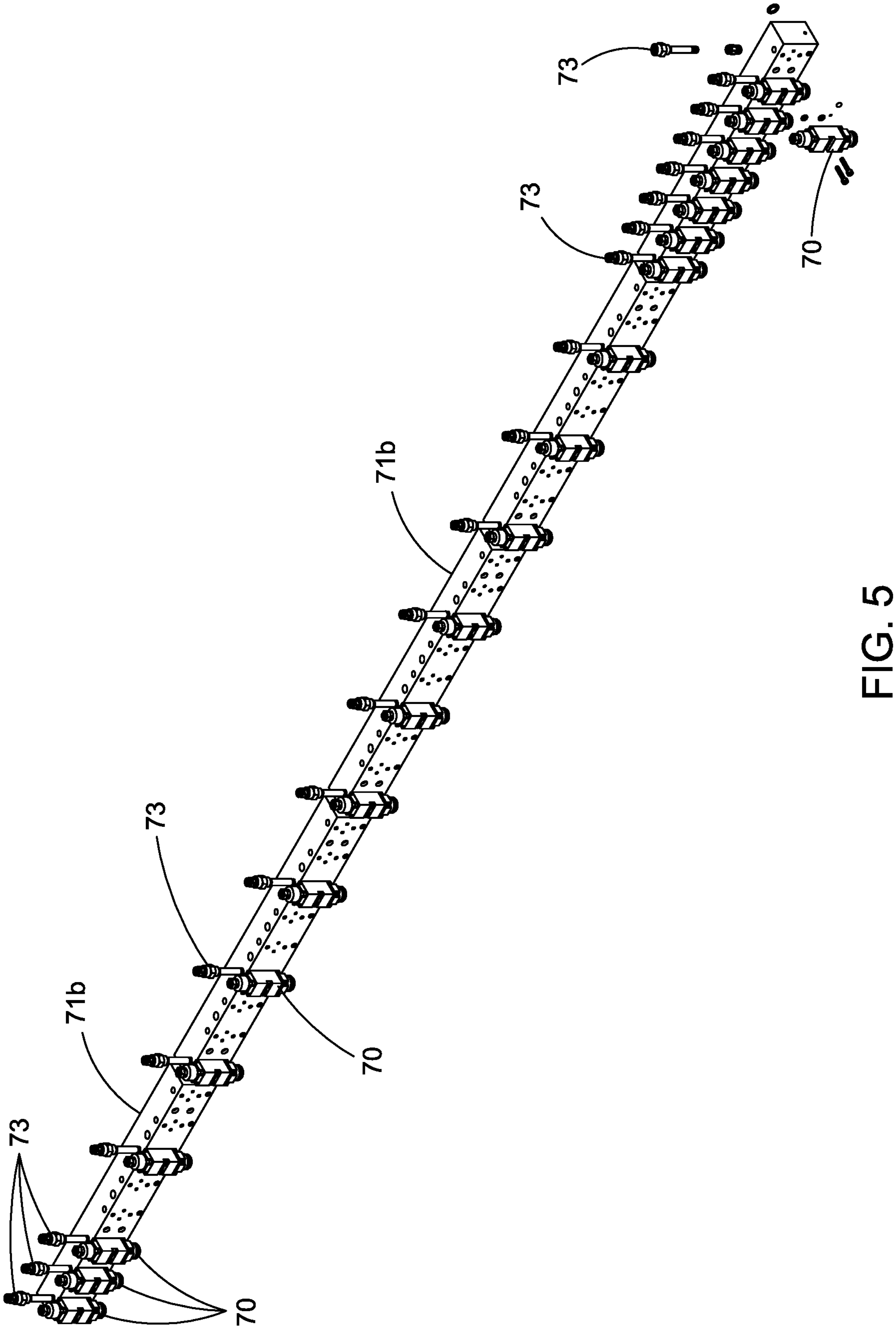
FIG. 5 is a perspective view of a plurality of hotmelt spray heads and a spray head manifold, with all spray heads and their respective spray head controller assembled into the spray head manifold except for the right end most spray head and its spray head controller.

Referring to FIGS. 5 and 6, other aspects of the plurality of hotmelt spray heads 70 are disclosed and now discussed further. Each spray head 70 has a complimentary spray head controller 73. And, groups of spray heads/controllers are further operated by a pneumatic manifold 72 (FIG. 1). The various groups of heads, controllers and manifolds 70, 73, 72, are secured to spray head manifold 71*a* or 71*b*, respectively. Manifolds 71*a*, 71*b* are secured to respective sides of elongated manifold portions 36, 38. As seen in FIG. 6, elongated manifold 20 can use an end block 48*b* having in internal fluid pathway, preferably u-shaped and of a constant internal cross-sectional diameter like manifold portions 36, 38, to connect up the main internal fluid pathways in each of manifold portions 36, 38. Alternatively, as seen in FIG. 1, elongated manifold 20 can use an end hotmelt hose connection 48*a* having in internal fluid pathway, preferably u-shaped and of a constant internal cross-sectional diameter like manifold portions 36, 38, to connect up the main internal fluid pathways in each of manifold portions 36, 38. The heads 70 are connected to spray head manifolds 71*a*, 71*b*, and those manifolds to respective sides of elongated manifold portions 36, 38, such that there is a spray head communication path between the spray head dispensing orifice (not shown) and the main internal fluid pathway, as would be known to do based on the teaching herein and the knowledge of one of ordinary skill in the art. And, while many spray heads and orifices are depicted in the Figures, as well as connection holes to assemble respective components together, the total number of heads and their location is variable, as desired by the user of the system. For each location where a spray head is not desired, it will be appropriately plugged at the spray head manifold by the system user so hotmelt adhesive cannot dispense at that location during use of system 10. The materials used for or to make the heads 70, 74, controllers 73, and manifolds 71*a*, 71*b*, 72 related thereto, are conventional and known to those of ordinary skill in the art, in combination with the teaching disclosed herein. To be clear, while the materials may be conventional, their uses and combined configurations are not conventional, and are new and different as taught herein.

Figure 11:
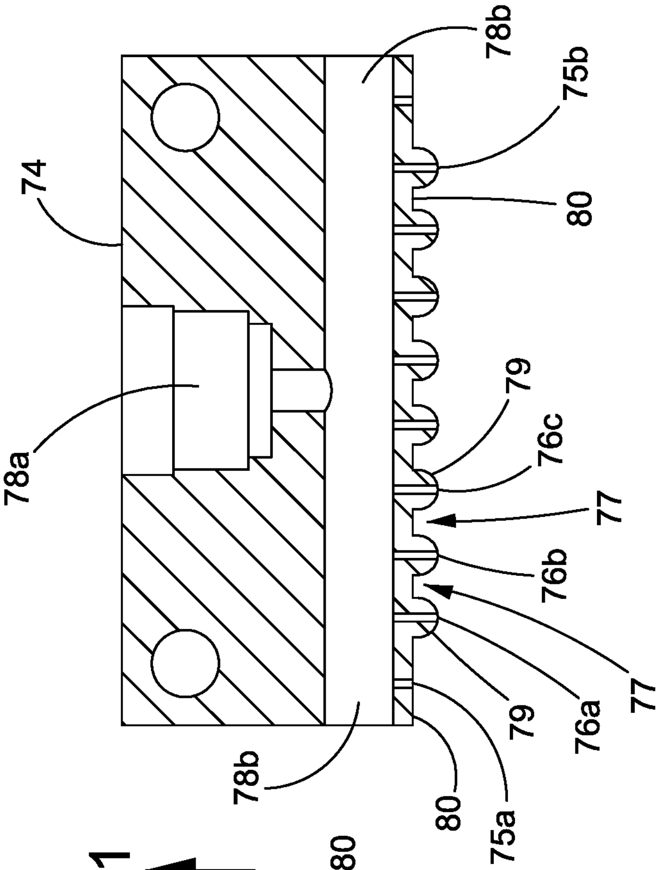
Figure 10:
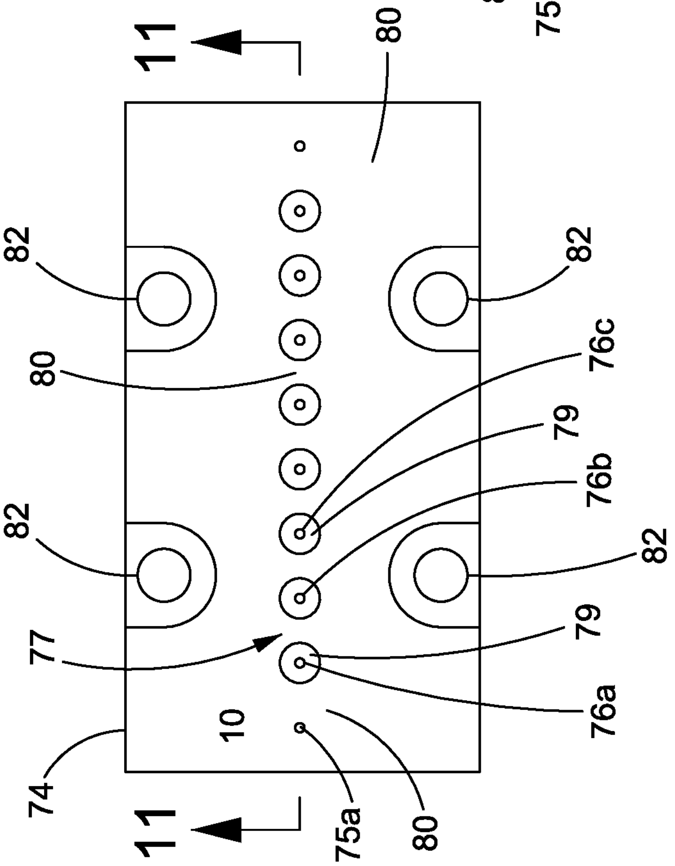
FIG. 10 is a bottom view of a dispersion spray head as an alternate type of hotmelt spray head for use with the system; and, FIG. 11 is a cross-sectional view of that in FIG. 10, taken along the line 11-11.

Building upon these spray head aspects, other advantages of system 10 can be employed to simplify operation and/or make operation of system 10 more reliable or safe. For example, the plurality of hotmelt spray heads can be substantially fully open or fully closed when the system continuously circulates hotmelt adhesive under the circulating pressure rate applying hotmelt adhesive to the moving substrate. Additionally, or alternatively, the main internal fluid pathway can have a spray head communication path to each of the plurality of hotmelt spray heads that is substantially the same for each of the plurality of hotmelt spray heads. Referring also to FIGS. 10 and 11, at least one of the plurality of hotmelt spray heads can include a dispersion head 74 with at least two distinct spaced apart hotmelt adhesive spray orifices **76*a*, 76*b*, and preferably the dispersion head dispensing path 78*a*, 78*b* being T-shaped as depicted. Additionally, preferably, the at least two distinct spaced apart hotmelt adhesive spray orifices 76*a*, 76*b* are at least three distinct spaced apart hotmelt adhesive spray orifices (and can be more orifices, like the total of 8 orifices seen here though all are not numbered) and the spray orifices 76*a*, 76*b*, 76*c* are arranged in a straight line relative to one another in the T-shaped dispensing path 78*a*, 78*b* of the dispersion head 74. Additionally, or alternatively, one or more spray orifice can be an orifice 75*a* combined with one or more orifices 76*a*, 76*b*, 76*c*, etc., and orifice 75*a* as further described herein Head 74 can be connected to a spray head 70 at dispensing path 78*a* by fitting head 74 onto the dispensing end of head 70. For example, mounting holes 82 can be bore into and through head 70 and thereby headed bolts passed through the holes to mount the head 70 as part of system 10. Portions 78*b* of the dispensing path can be closed at their outer ends and/or the outer ends of 78*b* remain open to fluidly communicate with another dispersion head (not shown) like head 74** and its dispensing path connected right next to the first head, if desired.

Without being limited to a theory of understanding, the inventors have surprisingly found the shape of the spray orifices can have an impact on the dispensing and/or application of the hotmelt adhesive onto the moving substrate, and doing so more evenly as individual streams of adhesive. For example, when two or more spray orifices are spaced from yet next to each other, preferably at least one of the orifices, and most preferably each such orifice next to each other orifice, has a portion of the orifice protruding from the dispersion head, such as shoulder area 79. More preferably, a recessed area is located in between the protruding portion of each of the orifices spaced from yet next to each other, such as recessed area 77 between shoulder areas 79. Additionally, if desired, orifice **75*a* can be generally flat and in the same plane as flat face 80 making up most of the surface area of the portion of the dispersion head facing the moving substrate during use and operation of system 10. Additionally, and more preferably, the shoulder area protrudes from the surrounding area, for example flat face 80 and/or recessed area 77**, a distance of about 0.07 inch (or in metric 1.78 mm) plus and minus 30% of this distance, more preferably a distance of about 0.07 inch (or in metric 1.78 mm) plus and minus 22% of this distance, and most preferably a distance of about 0.07 inch (or in metric 1.78 mm) plus and minus 15%. Additionally, and more preferably, the spray orifices are spaced from each other, and most preferably substantially evenly spaced from each other, and their spacing from the center most point of each spray orifice is in the range of about about 0.15 inch (or in metric 3.8 millimeters) plus and minus 30% of this spacing, more preferably about 0.15 inch (or in metric 3.8 millimeters) plus and minus 22% of this spacing, and most preferably about 0.15 inch (or in metric 3.8 millimeters) plus and minus 15% of this spacing.

Figure 2:
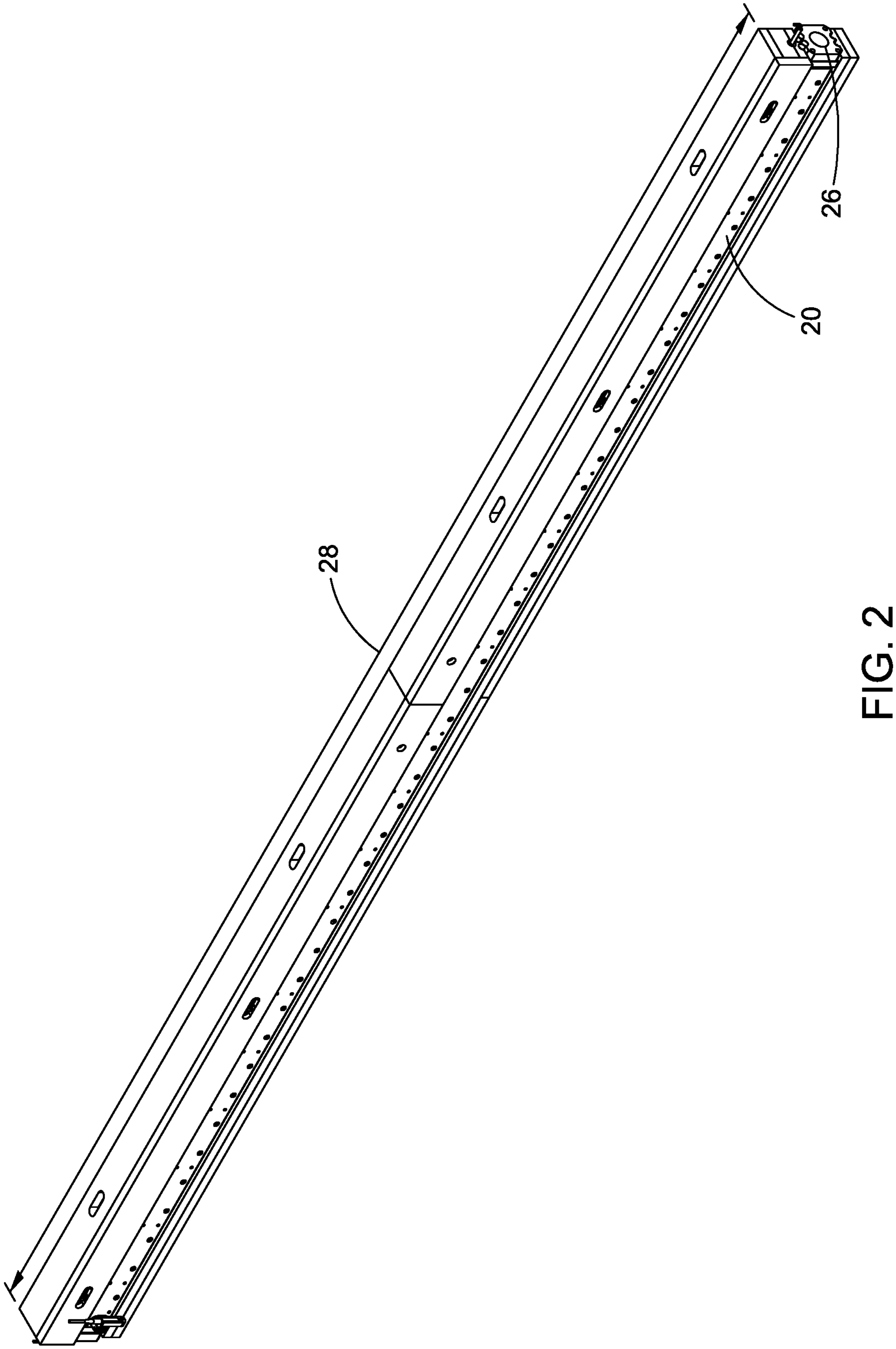
FIG. 2 is a perspective view of a first elongated manifold portion of the system seen in FIG. 1, depicting an assembled elongated manifold portion including an elongated heater.
Figure 3:
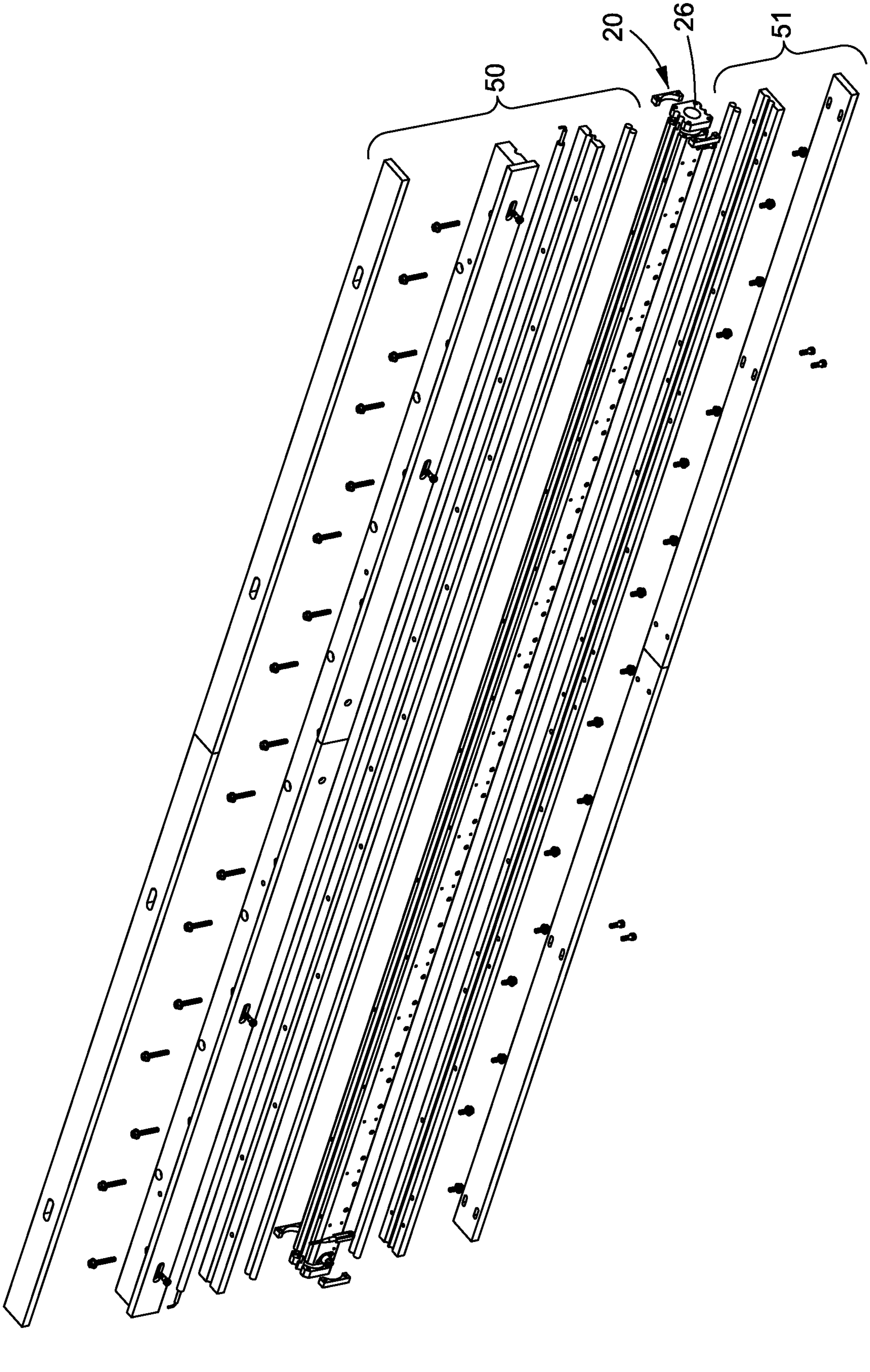
FIG. 3 is a perspective view of that in FIG. 2, depicted pre-assembly exploded apart.
Figure 4:
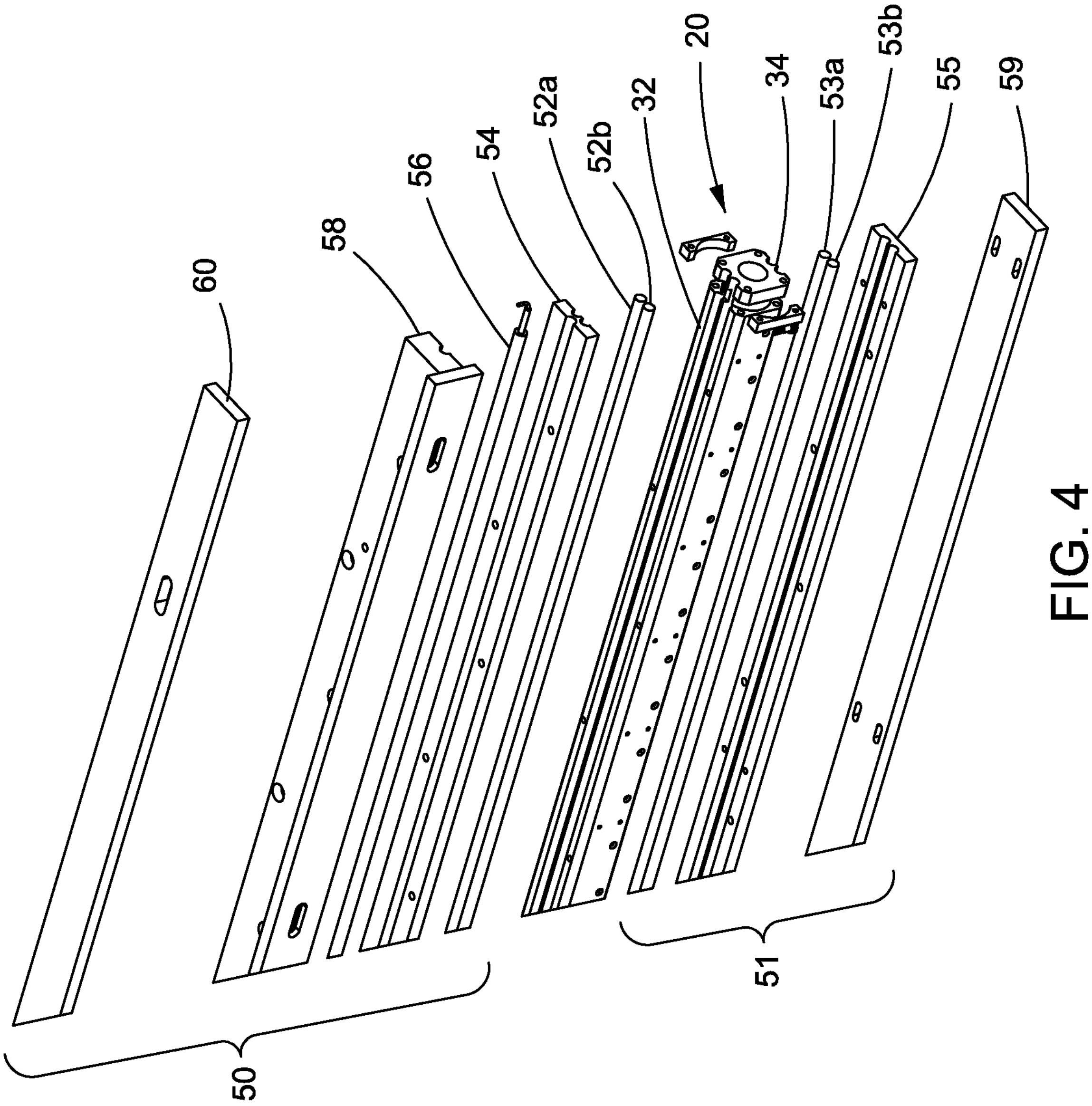
FIG. 4 is an enlarged perspective view of a right end portion of that seen in FIG. 3.

To further enable the new and different configurations for the fluid flow paths, and in particular further aiding consistent temperature and/or viscosity, attention is directed to FIGS. 2-4. For example, elongated manifold 20 preferably includes elongated heater 50 including a first elongated closed loop heat exchange pipe **52*a*, and more preferably also a second such pipe 52*b*, in thermal communication with the elongated manifold 20 and spaced from the main internal fluid pathway by a side wall 32 of the elongated manifold. Additionally, the elongated heater preferably includes a first elongated heat exchange bar 54: (i) in thermal communication with the elongated closed loop heat exchange pipe(s) 52*a*, 52*b* and the elongated manifold, and (ii) sandwiching the elongated closed loop heat exchange pipe(s) 52*a*, 52*b* between the first elongated heat exchange bar 54 and the side wall 32 of the elongated manifold. Still additionally, the elongated heater preferably includes a first elongated heating element 56: (i) in thermal communication with the first elongated heat exchange bar 54, and (ii) spaced from the elongated closed loop heat exchange pipe(s) 52*a*, 52*b* by the first elongated heat exchange bar 54. Yet still additionally, the elongated heater preferably includes a first elongated insulating cover 58: (i) in communication with the first elongated heat exchange bar 54, and (ii) sandwiching the first elongated heating element 56 between the first elongated insulating cover 58 and the first elongated heat exchange bar 54. A second cover 60 can also be located at a top side of the insulating cover 58**.

Building further upon these preferences for elongated heater 50, and still referring to FIGS. 2-4, the elongated manifold 20 preferably includes a second elongated heater 51. Second elongated heater 51 preferably includes a third elongated closed loop heat exchange pipe **53*a*, and more preferably also a fourth such pipe 53*b*, in thermal communication with the elongated manifold and spaced from the main internal fluid pathway 26 by an opposite side wall 34 of the elongated manifold. Additionally, the second elongated heater preferably includes a second elongated heat exchange bar 55: (i) in thermal communication with the elongated closed loop heat exchange pipe(s) 53*a*, 53*b* and the elongated manifold, and (ii) sandwiching the elongated closed loop heat exchange pipe(s) 53*a*, 53*b* between the second elongated heat exchange bar 55 and the opposite side wall 34 of the elongated manifold. Still additionally, the second elongated heater preferably includes a second elongated insulating cover 59: (i) in communication with the second elongated heat exchange bar 55, and (ii) sandwiching the second elongated heat exchange bar 55 between the second elongated insulating cover 59 and the opposite side wall 34. While second elongated heater 51 does not include a heating element like element 56 for elongate heater 50, heater 51 could do so. Additionally, or alternatively, heater 51 could be substantially the same configuration as heater 50, if desired. Additionally, preferably, the heaters 50, 51 can be used in each of first and second elongated manifold portions 36, 38, as the heaters 50, 51** are disclosed herein.

The materials used to make the components of the elongated manifold 20 are conventional materials known to those of ordinary skill in the art for the uses as taught herein, e.g., thermally conductive materials, insulating materials, heat creating materials, affixing materials. That said, while the materials may be conventional, their uses and configurations are not conventional, and are new and different as taught herein. For example, an exemplary form of the elongated closed loop heat exchange pipe(s) 52*a*, 52*b*, 53*a*, 53*b*, is known as ISOBAR® heat pipes made by Acrolab Ltd. of Windsor, Ontario, Canada. The use of such elongated closed loop heat exchange pipe(s) herein is unlike ever before for a hotmelt application system.

In other aspects of the disclosure here there is a process to apply hotmelt adhesive to a moving substrate, for example, using system 10. The process includes heating hotmelt adhesive in adhesive reservoir 120, for example, to liquefy the hotmelt adhesive and/or maintain it in a liquified state. The process also includes using elongated manifold 20 connected between adhesive delivery line 90 and adhesive return line 100. The elongated manifold has main internal fluid pathway 26 in fluid communication with adhesive delivery line 90 and adhesive return line 100 to transport hotmelt adhesive though elongate manifold 20. Another step is heating the elongated manifold to a substantially constant internal temperature when the hotmelt adhesive is transported through the elongated manifold. The process further includes flowing the hotmelt adhesive from the adhesive reservoir 120 to adhesive pump 110. Another step is filtering the hotmelt adhesive in the adhesive reservoir before the hotmelt adhesive enters the adhesive pump. A next step is pumping hotmelt adhesive at the circulating pressure rate to the adhesive delivery line 90 and from there to the main internal fluid pathway 26. Another step is spraying hotmelt adhesive through the plurality of hotmelt spray heads 70. The spray heads are connected to the elongated manifold and in fluid communication with the main internal fluid pathway 26 to receive the hotmelt adhesive. And, a next step is moving the substrate past the spray heads at an application speed to apply hotmelt adhesive to the moving substrate at an application rate. The process yet further includes continuously circulating hotmelt adhesive at the circulating pressure rate through the elongated manifold 20 before, during and after spraying hotmelt adhesive on the substrate 12. And, still another step is returning hotmelt adhesive to at least one of the adhesive pump and the adhesive reservoir. The steps of the process can be followed in any order unless specifically stated otherwise herein or a law of nature would dictate a particular order (e.g., hotmelt adhesive must first travel to and through the elongated manifold before it could be dispensed out of the spray heads that are connected to the elongated manifold).

Without being limited to a theory of understanding, and as discussed earlier, delivering a large volume of hotmelt adhesive, and doing so with a consistent temperature, pressure and/or viscosity, has proven particularly challenging for hotmelt delivery systems. Accordingly, to further enable desired pressure, temperature and/or viscosity, attention is directed to some preferred aspects of the system and process. For example, the circulating temperature for the hotmelt adhesive can be maintained at, preferably, between about 250 degrees Fahrenheit and about 375 degrees Fahrenheit. More preferably, the hotmelt adhesive circulating temperature can be between about 275 degrees Fahrenheit and about 350 degrees Fahrenheit. Still more preferably, the hotmelt adhesive circulating temperature can be between about 300 degrees Fahrenheit and about 325 degrees Fahrenheit. Additionally, or alternatively, the elongated manifold, preferably, can have a substantially constant internal temperature within about ten degrees Fahrenheit of the circulating temperature for the hotmelt adhesive, and even more preferably, doing this for substantially the entire length 28 of the elongated manifold. Still more preferably, and in order of increasing preference, the elongated manifold internal temperature is within about eight degrees Fahrenheit, within about five degrees Fahrenheit, or within about three degrees Fahrenheit, of the circulating temperature for the hotmelt adhesive, and also most preferably for substantially the entire length of the elongated manifold.

In regards to this more constant internal temperature for the elongated manifold 20 in combination with the circulating temperature, different hotmelt adhesives have different preferred melt points and subsequent temperature ranges to keep them at their preferred viscosity and not get too hot (and burn) nor too cool (and not flow well in a circulating system). For a hotmelt adhesive with a preferred circulating temperature range of 300 to 325 degrees Fahrenheit, then the least preferred elongated manifold internal temperature would be a range of about 290 to about 335 degrees Fahrenheit, a range plus and minus about ten degrees Fahrenheit. As another example, for a hotmelt adhesive with a preferred circulating temperature of 315 degrees Fahrenheit, then the least preferred elongated manifold internal temperature would be a range of about 305 to about 325 degrees Fahrenheit, a range plus and minus about ten degrees Fahrenheit.

Building further upon the desired pressure, temperature and/or viscosity, as well as ease of operating the system and process, attention is directed to yet other aspects. For example, the process and system can include, preferably, essentially not filtering hotmelt adhesive after it leaves the adhesive reservoir 120 and unless and until hotmelt adhesive returns to the adhesive reservoir. While at least some filtering of hotmelt adhesive in hotmelt application systems is required to prevent hotmelt contaminates plugging up the system somewhere, the inventors have discovered, contrary to the teaching in the art, that filtering only upstream of the adhesive pump can yield the unexpected benefit of filtering out contaminates while also not reducing the circulating pressure rate and/or the hotmelt adhesive application rate, unlike ever before possible and especially when trying to deliver a large volume of hotmelt adhesive. As another example, pumping hotmelt adhesive can be substantially operating the adhesive pump at pump capacity when the system is continuously circulating hotmelt adhesive at the circulating pressure rate. While the pump can be operated at any desired speed, by tending to operate it at speeds closer to and at its capacity, it simplifies operating system 10 and can eliminate the need for conventional monitoring of the system circulating pressure rate. With appropriate operation of valves in the system (e.g., in mechanisms 96, 128 and 130) and selective opening and closing the plurality of hotmelt spray heads 70, and all while operating the adhesive pump preferably at or near pump capacity, based on the teaching herein one or ordinary skill in the art can achieve the desired application rate of hotmelt adhesive onto the moving substrate 12.

Additionally, or alternatively, building upon each of the prior discussed aspects, for example, the process can include, preferably, pumping hotmelt adhesive through the main internal fluid pathway at the application rate of at least about 150 grams per second to about 250 grams per second. And, more preferably, the application rate is at least about 175 grams per second to about 225 grams per second. Additionally, while this system and process is particularly capable to deliver a high volume of hotmelt adhesive over a relatively short period of time unlike ever before possible, it can also deliver a traditional application rate of hotmelt adhesive as low as ten grams per second to fifty grams per second if desired, by selectively closing more of the spray heads 70, i.e., using less in the open condition when dispensing hotmelt adhesive onto moving substrate 12. And then additionally, or alternatively, at least in part based upon one or more of the prior discussed aspects, the process can include, preferably, the hotmelt adhesive having substantially constant viscosity when spraying to apply hotmelt adhesive to the moving substrate at the application rate. At least in part, this is due to a more consistent temperature of the elongated manifold as taught herein. As another example, employing one or more of the aspects discussed herein, the application speed of the moving substrate 12 underneath spray heads 70 on delivery conveyor 14 can be at least about 120 feet per minute, and the hotmelt adhesive application rate can be at least about three gallons per minute, both of these capabilities alone, and especially in combination, preferred for system 10. The application speed of the moving substrate 12 underneath spray heads 70 on delivery conveyor 14 before the disclosed system 10 and process was at most about 40 to 60 feet per minute. Further, more preferably, and in order of increasing preference, the application speed of substrate 12 is at least about 120 feet per minute, at least about 140 feet per minute, at least about 160 feet per minute, at least about 180 feet per minute, at least about 200 feet per minute.

Building further upon the desired application speed and/or volume of hotmelt adhesive through the system, as well as ease of and consistency in operating the system and process, attention is directed to yet other aspects. For example, the process and system can include, preferably, a compressed air accumulator 140. Accumulator 140 is sized and functions to hold a large volume of compressed air, e.g., at least about 150 cubic inches of air, more preferably at least about 175 cubic inches of air and most preferably at least about 200 cubic inches of air, and/or doing so in close proximity to parts of system 10 that need compressed air to operate and/or do so more effectively. In operation, the accumulator discharges and recharges throughout the process and use of the equipment. For example, a large volume of compressed air may not be available from a standard compressed air supply line to be able to consistently and reliably dispense the desired volume of hotmelt from system 10. Thus, preferably, the accumulator charges (i.e., refills) when not applying hotmelt adhesive (e.g., for several seconds), and then discharges (i.e., outputs) compressed air to more reliably operate the spray head manifold(s) and the spray head controllers during the process and specifically during the act of dispensing the desired volume of hotmelt adhesive from system 10 (i.e., less time than to refill). And, more preferably, this cycle repeats itself many times during the process to provide the desired amount of compressed air. An air supply connection joint 142 is part of accumulator 140, and a conventional compressed air supply line (not shown) can be connected to joint 142 for providing compressed air into accumulator 140. Accumulator 140 has one or more distribution line 144 in fluid communication with parts of system 10, for example pneumatic manifolds 72, which in turn use compressed air to operate the spray head controllers 73 that open and close the hotmelt spray heads 70 to selectively dispense hotmelt adhesive onto the substrate 12 as desired by the user. Preferably, there is a distribution line 144 to each side of each manifold 72, but manifolds can be linked together and lines 144 supplied to just the outside most manifold in a group of manifolds. Each of these features can, preferably, assist to supply more consistent air to better control the manifolds 72 which in turn operate each spray head controller (i.e., its valve). That is, more air equals more consistent application of hotmelt adhesive that helps with more consistent valve control at the start of hotmelt adhesive application from the spray heads 70.

Additional discussion of embodiments in various scopes now follows:

A. A system that continuously circulates hotmelt adhesive at a circulating pressure rate before, during and after applying hotmelt adhesive to a moving substrate on a substrate delivery conveyor. The system includes an adhesive delivery line connected to a first end of an elongated manifold and an adhesive return line connected to an opposite end of the elongated manifold. The elongated manifold includes a main internal fluid pathway in fluid communication with the adhesive delivery line and the adhesive return line to transport the hotmelt adhesive from the first end to the opposite end. The elongated manifold also includes an elongated heater in thermal communication with the main internal fluid pathway and providing a substantially constant internal temperature to the elongated manifold when the hotmelt adhesive is transported from the first end of the elongated manifold to the opposite end of the elongated manifold. The system further includes an adhesive pump in fluid communication with both the adhesive delivery line and an adhesive reservoir. The adhesive pump is transporting the hotmelt adhesive from the adhesive reservoir to the adhesive delivery line under pressure. The adhesive reservoir is including a filter that filters the hotmelt adhesive before the hotmelt adhesive enters the adhesive pump. A plurality of hotmelt spray heads are connected with the elongated manifold and in fluid communication with the main internal fluid pathway to receive the hotmelt adhesive and dispense the hotmelt adhesive onto the moving substrate. The adhesive return line is in fluid communication with at least one of the adhesive pump and the adhesive reservoir to transport hotmelt adhesive that has circulated through the elongated manifold.

B. The system of any of the prior embodiments, further including the adhesive return line in fluid communication with both of the adhesive pump and the adhesive reservoir to transport hotmelt adhesive that has circulated through the elongated manifold.

C. The system of any of the prior embodiments, further including the adhesive reservoir in fluid communication with the adhesive return line to receive hotmelt adhesive that has circulated through the elongated manifold and the hotmelt adhesive then passes though the filter.

D. The system of any of the prior embodiments, further including the adhesive pump in fluid communication with the adhesive return line to receive hotmelt adhesive that has circulated through the elongated manifold and return hotmelt adhesive to the adhesive delivery line.

E. The system of any of the prior embodiments, further including the adhesive pump in fluid communication with the adhesive return line to receive hotmelt adhesive that has circulated through the elongated manifold and return hotmelt adhesive to the adhesive delivery line without passing through the adhesive reservoir.

F. The system of any of the prior embodiments, further including the adhesive pump in fluid communication with the adhesive return line to receive hotmelt adhesive that has circulated through the elongated manifold and return hotmelt adhesive to the adhesive delivery line while also receiving hotmelt adhesive from the adhesive reservoir.

G. The system of any of the prior embodiments, further including the hotmelt adhesive from the adhesive delivery line bypassing the adhesive pump and only entering the adhesive reservoir and from there passes through the filter and travels back to the adhesive pump.

H. The system of any of the prior embodiments, wherein transport of the hotmelt adhesive can occur simultaneously to the adhesive pump and to the adhesive reservoir.

I. The system of any of the prior embodiments, wherein the hotmelt adhesive passes though the filter at a filter pressure rate, and the filter pressure rate is less than the circulating pressure rate of the hotmelt adhesive transported through the elongated manifold.

J. The system of any of the prior embodiments, wherein the filter pressure rate is no more than about 5% of the circulating pressure rate.

K. The system of any of the prior embodiments, wherein the hotmelt adhesive transported through the system is essentially unfiltered after the hotmelt adhesive leaves the adhesive reservoir and unless the hotmelt adhesive returns to the adhesive reservoir.

L. The system of any of the prior embodiments, wherein the adhesive pump operates at pump capacity when the system continuously circulates hotmelt adhesive under the circulating pressure rate applying hotmelt adhesive to the moving substrate.

M. The system of any of the prior embodiments, wherein the plurality of hotmelt spray heads are substantially fully open or fully closed when the system continuously circulates hotmelt adhesive under the circulating pressure rate applying hotmelt adhesive to the moving substrate.

N. The system of any of the prior embodiments, wherein the hotmelt adhesive has a substantially constant viscosity when the system continuously circulates hotmelt adhesive under the circulating pressure rate applying hotmelt adhesive to the moving substrate.

O. The system of any of the prior embodiments, wherein the main internal fluid pathway has a length of at least one meter and a cross-sectional diameter of about 1 centimeter to about 5 centimeters.

P. The system of any of the prior embodiments, wherein the substrate delivery conveyor moves the substrate past the spray heads at an application speed to apply hotmelt adhesive to the moving substrate at an application rate while the system continuously circulates hotmelt adhesive before, during and after applying hotmelt adhesive to the moving substrate.

Q. The system of any of the prior embodiments, wherein the main internal fluid pathway has a substantially same cross-sectional diameter along its length.

R. The system of any of the prior embodiments, wherein the main internal fluid pathway has a spray head communication path to each of the plurality of hotmelt spray heads that is substantially the same for each of the plurality of hotmelt spray heads.

S. The system of any of the prior embodiments, wherein the elongated heater comprises a first elongated closed loop heat exchange pipe in thermal communication with the elongated manifold and spaced from the main internal fluid pathway by a side wall of the elongated manifold.

T. The system of any of the prior embodiments, wherein the elongated heater further comprises a first elongated heat exchange bar (i) in thermal communication with the first elongated closed loop heat exchange pipe and the elongated manifold and (ii) sandwiching the first elongated closed loop heat exchange pipe between the first elongated heat exchange bar and the side wall of the elongated manifold.

U. The system of any of the prior embodiments, wherein the elongated heater further comprises a first elongated heating element (i) in thermal communication with the first elongated heat exchange bar and (ii) spaced from the first elongated closed loop heat exchange pipe by the first elongated heat exchange bar.

V. The system of any of the prior embodiments, wherein the elongated heater further comprises a first elongated insulating cover (i) in communication with the first elongated heat exchange bar and (ii) sandwiching the first elongated heating element between the first elongated insulating cover and the first elongated heat exchange bar.

W. The system of any of the prior embodiments, wherein the elongated heater further comprises a second elongated closed loop heat exchange pipe in thermal communication with the elongated manifold and spaced from the main internal fluid pathway by the side wall of the elongated manifold.

X. The system of any of the prior embodiments, wherein the elongated heater further comprises a second elongated closed loop heat exchange pipe in thermal communication with the elongated manifold and spaced from the main internal fluid pathway by an opposite side wall of the elongated manifold.

Y. The system of any of the prior embodiments, wherein the elongated manifold comprises a first elongated manifold portion and a second elongated manifold portion, with each elongated manifold portion arranged parallel to each other elongated manifold portion in a u-shaped relationship and fixed together relative to each other.

Z. The system of any of the prior embodiments, wherein the u-shaped relationship comprises a side by side arrangement.

AA. The system of any of the prior embodiments, wherein at least one of the plurality of hotmelt spray heads comprises a dispersion head with at least two distinct spaced apart hotmelt adhesive spray orifices.

BB. The system of any of the prior embodiments, wherein the dispersion head dispensing path is T-shaped.

CC. The system of any of the prior embodiments, wherein the at least two distinct spaced apart hotmelt adhesive spray orifices comprises at least three distinct spaced apart hotmelt adhesive spray orifices and the spray orifices are arranged in a straight line relative to one another in the T-shaped dispersion head.

DD. The system of any of the prior embodiments, wherein at least one of the plurality of hotmelt spray heads comprises a dispersion head with at least two distinct spaced apart hotmelt adhesive spray orifices.

EE. The system of any of the prior embodiments, wherein the dispersion head dispensing path is T-shaped.

FF. The system of any of the prior embodiments, wherein the at least two distinct spaced apart hotmelt adhesive spray orifices comprises at least three distinct spaced apart hotmelt adhesive spray orifices and the spray orifices are arranged in a straight line relative to one another in the T-shaped dispersion head.

GG. The system of any of the prior embodiments, wherein the at least two distinct spaced apart hotmelt adhesive spray orifices each have at least a portion protruding from the dispersion head.

HH. The system of any of the prior embodiments, wherein the portion protruding from the dispersion head forms a shoulder area.

II. The system of any of the prior embodiments, further comprising a recessed area located between the portion protruding of each of the at least two distinct spaced apart hotmelt adhesive spray orifices.

JJ. The system of any of the prior embodiments, further comprising a flat face surrounding the portion protruding of each of the at least two distinct spaced apart hotmelt adhesive spray orifices.

KK. The system of any of the prior embodiments, further comprising a compressed air accumulator, and the compressed air accumulator in communication with the plurality of hotmelt spray heads to supply compressed air to the plurality of hotmelt spray heads.

LL. A process to apply hotmelt adhesive to a moving substrate. The process includes heating hotmelt adhesive in an adhesive reservoir. The process also includes using an elongated manifold connected between an adhesive delivery line and an adhesive return line, the elongated manifold having a main internal fluid pathway in fluid communication with the adhesive delivery line and the adhesive return line to transport hotmelt adhesive though the elongate manifold. Another step is heating the elongated manifold to a substantially constant internal temperature when the hotmelt adhesive is transported through the elongated manifold. And, a step of flowing the hotmelt adhesive from the adhesive reservoir to the adhesive pump. The process also includes filtering the hotmelt adhesive in the adhesive reservoir before the hotmelt adhesive enters an adhesive pump. Another step is pumping hotmelt adhesive at a circulating pressure rate to the adhesive delivery line and thereby to the main internal fluid pathway. And, a step of spraying hotmelt adhesive through a plurality of hotmelt spray heads, the spray heads connected to the elongated manifold and in fluid communication with the main internal fluid pathway to receive the hotmelt adhesive. Further, there is moving the substrate past the spray heads at an application speed to apply hotmelt adhesive to the moving substrate at an application rate. There is also continuously circulating hotmelt adhesive at the circulating pressure rate through the elongated manifold before, during and after spraying hotmelt adhesive on the substrate. And, another step is returning hotmelt adhesive to at least one of the adhesive pump and the adhesive reservoir.

MM. The process of any of the prior process embodiments, wherein filtering the hotmelt adhesive occurs substantially only in the adhesive reservoir once hotmelt adhesive enters the hotmelt reservoir.

NN. The process of any of the prior process embodiments, wherein pumping hotmelt adhesive through the main internal fluid pathway comprises the application rate of at least 150 grams per second and wherein a substantially constant internal temperature is within about ten degrees Fahrenheit of a circulating temperature for the hotmelt adhesive for substantially an entire length of the elongated manifold.

OO. The process of any of the prior process embodiments, wherein the application rate is at least 175 grams per second.

PP. The process of any of the prior process embodiments, wherein the application rate is no more than about 225 grams per second.

QQ. The process of any of the prior process embodiments, wherein substantially constant internal temperature of the elongated manifold comprises within about eight degrees Fahrenheit of the circulating temperature.

RR. The process of any of the prior process embodiments, wherein substantially constant internal temperature of the elongated manifold comprises within about five degrees Fahrenheit of the circulating temperature.

SS. The process of any of the prior process embodiments, wherein the circulating temperature for the hotmelt adhesive is between about 250 degrees Fahrenheit and about 375 degrees Fahrenheit.

TT. The process of any of the prior process embodiments, wherein filtering the hotmelt adhesive occurs substantially only before the hotmelt adhesive enters the adhesive pump.

UU. The process of any of the prior process embodiments, further including directing hotmelt adhesive under pressure from the adhesive return line to the adhesive pump and from there hotmelt adhesive passing though the adhesive pump and returning to the adhesive delivery line under pressure.

VV. The process of any of the prior process embodiments, further including hotmelt adhesive from the adhesive return line not passing through the adhesive reservoir.

WW. The process of any of the prior process embodiments, further including directing hotmelt adhesive under pressure from the adhesive return line to the adhesive reservoir and from there hotmelt adhesive passing though the adhesive reservoir and the filter and flowing back to the adhesive pump.

XX. The process of any of the prior process embodiments, further including hotmelt adhesive from the adhesive return line under pressure not passing through the adhesive pump until the hotmelt adhesive has first passed through the adhesive reservoir and the filter and then flowing to the adhesive pump.

YY. The process of any of the prior process embodiments, further including simultaneously directing hotmelt adhesive under pressure from the adhesive return line to the adhesive reservoir and from there hotmelt adhesive passing though the adhesive reservoir and the filter and flowing back to the adhesive pump.

ZZ. The process of any of the prior process embodiments, wherein filtering comprises passing hotmelt adhesive though the filter at a filter pressure rate, and the filter pressure rate is less than the circulating pressure rate of the hotmelt adhesive transported through the elongated manifold.

AAA. The process of any of the prior process embodiments, wherein the filter pressure rate is no more than about 5% of the circulating pressure rate.

BBB. The process of any of the prior process embodiments, further including essentially not filtering hotmelt adhesive after it leaves the adhesive reservoir and unless and until hotmelt adhesive returns to the adhesive reservoir.

CCC. The process of any of the prior process embodiments, wherein pumping hotmelt adhesive comprises substantially operating the adhesive pump at pump capacity when the system is continuously circulating hotmelt adhesive at the circulating pressure rate.

DDD. The process of any of the prior process embodiments, wherein spraying hotmelt adhesive comprises substantially fully opening or fully closing each of the plurality of hotmelt spray heads to apply hotmelt adhesive to the moving substrate at the application rate.

EEE. The process of any of the prior process embodiments, wherein the hotmelt adhesive has a substantially constant viscosity when spraying to apply hotmelt adhesive to the moving substrate at the application rate.

FFF. The process of any of the prior process embodiments, further comprising accumulating a volume of compressed air in communication with the plurality of hotmelt spray heads.

GGG. The process of any of the prior process embodiments, further comprising supplying some of the volume of compressed air to the plurality of hotmelt spray heads to activate the plurality of hotmelt spray heads.

HHH. The process of any of the prior process embodiments, further comprising substantially simultaneously activating the plurality of hotmelt spray heads with some of the volume of compressed air.

Each and every document cited in this present application, including any cross referenced or related patent or application, is incorporated in this present application in its entirety by this reference, unless expressly excluded or otherwise limited. The citation of any document is not an admission that it is prior art with respect to any embodiment disclosed in this present application or that it alone, or in any combination with any other reference or references, teaches, suggests, or discloses any such embodiment. Further, to the extent that any meaning or definition of a term in this present application conflicts with any meaning or definition of the same term in a document incorporated by reference, the meaning or definition assigned to that term in this present application governs.

The present invention includes the description, examples, embodiments, and drawings disclosed; but it is not limited to such description, examples, embodiments, or drawings. As briefly described above, the reader should assume that features of one disclosed embodiment can also be applied to all other disclosed embodiments, unless expressly indicated to the contrary. Unless expressly indicated to the contrary, the numerical parameters set forth in the present application are approximations that can vary depending on the desired properties sought to be obtained by a person of ordinary skill in the art without undue experimentation using the teachings disclosed in the present application. Modifications and other embodiments will be apparent to a person of ordinary skill in the hotmelt adhesive equipment arts, and all such modifications and other embodiments are intended and deemed to be within the scope of the present invention.

What is claimed is:

1. A system that continuously circulates hotmelt adhesive at a circulating pressure rate before, during and after applying hotmelt adhesive to a moving substrate on a substrate delivery conveyor comprising:

an adhesive delivery line connected to a first end of an elongated manifold and an adhesive return line connected to an opposite end of the elongated manifold;

the elongated manifold comprising a main internal fluid pathway in fluid communication with the adhesive delivery line and the adhesive return line to transport the hotmelt adhesive from the first end to the opposite end;

the elongated manifold comprising an elongated heater in thermal communication with the main internal fluid pathway and providing a substantially constant internal temperature to the elongated manifold when the hotmelt adhesive is transported from the first end of the elongated manifold to the opposite end of the elongated manifold;

an adhesive pump in fluid communication with both the adhesive delivery line and an adhesive reservoir, the adhesive pump transporting the hotmelt adhesive from the adhesive reservoir to the adhesive delivery line under pressure, and the adhesive reservoir including a filter that filters the hotmelt adhesive before the hotmelt adhesive enters the adhesive pump;

a plurality of hotmelt spray heads connected with the elongated manifold and in fluid communication with the main internal fluid pathway to receive the hotmelt adhesive and dispense the hotmelt adhesive onto the moving substrate; and, the adhesive return line in fluid communication with at least one of the adhesive pump and the adhesive reservoir to transport hotmelt adhesive that has circulated through the elongated manifold.

2. The system of claim 1, further comprising the adhesive return line in fluid communication with both of the adhesive pump and the adhesive reservoir to transport hotmelt adhesive that has circulated through the elongated manifold.

3. The system of claim 1, further comprising the adhesive reservoir in fluid communication with the adhesive return line to receive hotmelt adhesive that has circulated through the elongated manifold and the hotmelt adhesive then passes though the filter.

4. The system of claim 1, further comprising the adhesive pump in fluid communication with the adhesive return line to receive hotmelt adhesive that has circulated through the elongated manifold and return hotmelt adhesive to the adhesive delivery line.

5. The system of claim 4, further comprising the adhesive pump in fluid communication with the adhesive return line to receive hotmelt adhesive that has circulated through the elongated manifold and return hotmelt adhesive to the adhesive delivery line without passing through the adhesive reservoir.

6. The system of claim 4, further comprising the adhesive pump in fluid communication with the adhesive return line to receive hotmelt adhesive that has circulated through the elongated manifold and return hotmelt adhesive to the adhesive delivery line while also receiving hotmelt adhesive from the adhesive reservoir.

7. The system of claim 3, further comprising the hotmelt adhesive from the adhesive delivery line bypassing the adhesive pump and only entering the adhesive reservoir and from there passes through the filter and travels back to the adhesive pump.

8. The system of claim 1, wherein transport of the hotmelt adhesive can occur simultaneously to the adhesive pump and to the adhesive reservoir.

9. The system of claim 1, wherein the hotmelt adhesive passes though the filter at a filter pressure rate, and the filter pressure rate is less than the circulating pressure rate of the hotmelt adhesive transported through the elongated manifold.

10. The system of claim 9, wherein the filter pressure rate is no more than about 5% of the circulating pressure rate.

11. The system of claim 9, wherein the filter is at least partially submerged in liquified hotmelt adhesive in the reservoir.

12. The system of claim 11, wherein the filter is mounted at an angle relative to vertical.

13. The system of claim 11, wherein the angle is between about 70 degrees to about 20 degrees off of vertical.

14. The system of claim 1, wherein the hotmelt adhesive transported through the system is essentially unfiltered after the hotmelt adhesive leaves the adhesive reservoir and unless the hotmelt adhesive returns to the adhesive reservoir.

15. The system of claim 1, wherein the adhesive pump operates at pump capacity when the system continuously circulates hotmelt adhesive under the circulating pressure rate applying hotmelt adhesive to the moving substrate.

16. The system of claim 1, wherein the plurality of hotmelt spray heads are substantially fully open or fully closed when the system continuously circulates hotmelt adhesive under the circulating pressure rate applying hotmelt adhesive to the moving substrate.

17. The system of claim 1, wherein the hotmelt adhesive has a substantially constant viscosity when the system continuously circulates hotmelt adhesive under the circulating pressure rate applying hotmelt adhesive to the moving substrate.

18. The system of claim 1, wherein the main internal fluid pathway has a length of at least one meter and a cross-sectional diameter of about 1 centimeter to about 5 centimeters.

19. The system of claim 1, wherein the substrate delivery conveyor moves the substrate past the spray heads at an application speed to apply hotmelt adhesive to the moving substrate at an application rate while the system continuously circulates hotmelt adhesive before, during and after applying hotmelt adhesive to the moving substrate.

20. The system of claim 1, wherein the main internal fluid pathway has a substantially same cross-sectional diameter along its length.

21. The system of claim 1, wherein the main internal fluid pathway has a spray head communication path to each of the plurality of hotmelt spray heads that is substantially the same for each of the plurality of hotmelt spray heads.

22. The system of claim 1, wherein the elongated heater comprises a first elongated closed loop heat exchange pipe in thermal communication with the elongated manifold and spaced from the main internal fluid pathway by a side wall of the elongated manifold.

23. The system of claim 22, wherein the elongated heater further comprises a first elongated heat exchange bar (i) in thermal communication with the first elongated closed loop heat exchange pipe and the elongated manifold and (ii) sandwiching the first elongated closed loop heat exchange pipe between the first elongated heat exchange bar and the side wall of the elongated manifold.

24. The system of claim 23, wherein the elongated heater further comprises a first elongated heating element (i) in thermal communication with the first elongated heat exchange bar and (ii) spaced from the first elongated closed loop heat exchange pipe by the first elongated heat exchange bar.

25. The system of claim 24, wherein the elongated heater further comprises a first elongated insulating cover (i) in communication with the first elongated heat exchange bar and (ii) sandwiching the first elongated heating element between the first elongated insulating cover and the first elongated heat exchange bar.

26. The system of claim 25, wherein the elongated heater further comprises a second elongated closed loop heat exchange pipe in thermal communication with the elongated manifold and spaced from the main internal fluid pathway by the side wall of the elongated manifold.

27. The system of claim 23, wherein the elongated heater further comprises a second elongated closed loop heat exchange pipe in thermal communication with the elongated manifold and spaced from the main internal fluid pathway by an opposite side wall of the elongated manifold.

28. The system of claim 1, wherein the elongated manifold comprises a first elongated manifold portion and a second elongated manifold portion, with each elongated manifold portion arranged parallel to each other elongated manifold portion in a u-shaped relationship and fixed together relative to each other.

29. The system of claim 28, wherein the u-shaped relationship comprises a side by side arrangement.

30. The system of claim 1, wherein at least one of the plurality of hotmelt spray heads comprises a dispersion head with at least two distinct spaced apart hotmelt adhesive spray orifices.

31. The system of claim 30, wherein the dispersion head dispensing path is T-shaped.

32. The system of claim 31, wherein the at least two distinct spaced apart hotmelt adhesive spray orifices comprises at least three distinct spaced apart hotmelt adhesive spray orifices and the spray orifices are arranged in a straight line relative to one another in the T-shaped dispersion head.

33. The system of claim 30, wherein the at least two distinct spaced apart hotmelt adhesive spray orifices each have at least a portion protruding from the dispersion head.

34. The system of claim 33, wherein the portion protruding from the dispersion head forms a shoulder area.

35. The system of claim 33, further comprising a recessed area located between the portion protruding of each of the at least two distinct spaced apart hotmelt adhesive spray orifices.

36. The system of claim 33, further comprising a flat face surrounding the portion protruding of each of the at least two distinct spaced apart hotmelt adhesive spray orifices.

37. The system of claim 1, further comprising a compressed air accumulator, and the compressed air accumulator in communication with the plurality of hotmelt spray heads to supply compressed air to the plurality of hotmelt spray heads.

* * * * *